(No Model.)

A. SEARLS.
WHIP SOCKET FASTENER.

No. 283,520. Patented Aug. 21, 1883.

Witnesses:
Henry Pickling
A. N. Vermilye

Inventor
Anson Searls
by J. T. Hull
his Atty.

UNITED STATES PATENT OFFICE.

ANSON SEARLS, OF NEWARK, NEW JERSEY.

WHIP-SOCKET FASTENER.

SPECIFICATION forming part of Letters Patent No. 283,520, dated August 21, 1883.

Application filed January 2, 1883. (No model.)

*To all whom it may concern:*

Be it known that I, ANSON SEARLS, residing in the city of Newark, in the county of Essex and State of New Jersey, have invented a new and useful Improvement in Whip-Socket Fasteners, of which the following is a specification, reference being had to the accompanying drawings, forming part of the same, in which—

Figure 1:
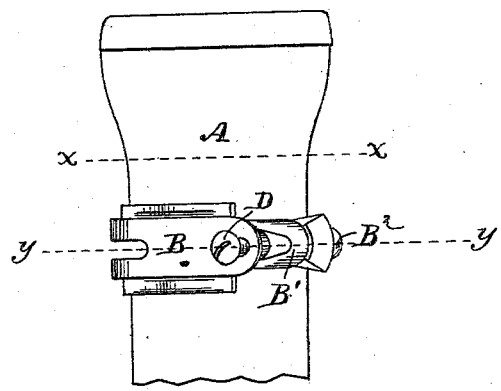
Figure 2:
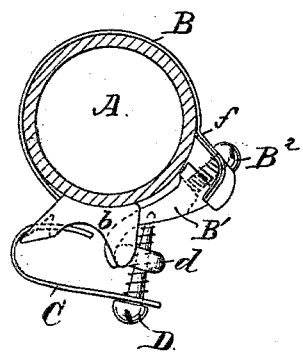
Figure 3:
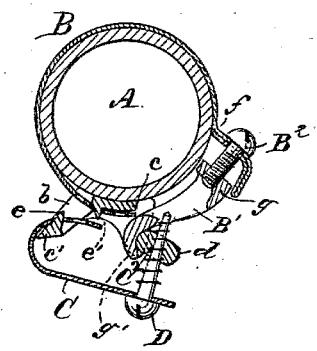

Figure 1 is a side view of the top portion of a whip-socket with a fastener containing my improvement attached thereto. Figs. 2 and 3 are cross-sections of the same, one on line $xx$ and the other on line $yy$ of Fig. 1.

My invention relates to the method of securing the fastener to the socket; and it consists in the combination of devices herein described and claimed, A is the body of an ordinary tubular whip-socket, made of wood, iron, or other suitable material. The fastener, as shown, consists of a buckle-frame, a band-loop, C, and a screw, D. The buckle-frame is formed of two side plates, $bb$, united by a center cross-bar, $c$, and two end cross-bars, $c'$ $c^2$. The cross-bar $c$ is broad and concave on its inner face, to conform to the convex surface of the socket when laid upon it lengthwise. On the cross-bar $c^2$ is formed a lug or projection, $d$, provided with a screw-tapped hole to receive the screw D. The band-loop C is provided at one end with a hole or holes, that engages with a spur, $e$, formed on the cross-bar $c'$, and at the other end with a hole, through which the screw D passes. This band-loop and the described buckle-frame form a clamp for attaching the socket to the dash-rail of a vehicle.

I do not here claim anything as new in the fastener so far as the same is above described, such fastener being the subject-matter of another and separate application made or to be made by me for a patent therefor.

My present invention relates to the devices for securing the whip-socket fastener to the whip-socket. These devices are the metal band B, the tongue B', and the screw B². One end of the band is provided with a hole or holes to engage with a spur, $e'$, formed on the cross-bar $c$, and the other end is bent outward from the socket, as shown at $f$, Figs. 2 and 3, and provided with a hole, through which passes the screw B². The tongue B' is provided with a screw-threaded hole at its base $g$ to receive the screw B², and is curved outward at its point $g'$. This point being hooked under the cross-bar $c^2$, and the base of the tongue being connected to the end of the band B by the screw B², by turning down the said screw the band and the fastener are secured to the socket. The end of the said band through which the screw B² passes is preferably bent back upon itself, as shown in Figs. 2 and 3, to give it greater strength.

What I claim, and desire to secure by Letters Patent, is—

The combination, on a whip-socket, of the described fastener, with the band B, the tongue B', and the screw B², as and for the purpose specified.

ANSON SEARLS.

In presence of—
 A. G. N. VERMILYA,
 HENRY J. EICHLING.